March 29, 1955  F. P. BUNDY  2,705,313
MAGNETOSTRICTION OSCILLATOR
Filed March 28, 1945

Inventor
FRANCIS P. BUNDY
By Ralph L. Chappell
Attorney

United States Patent Office 2,705,313
Patented Mar. 29, 1955

2,705,313

MAGNETOSTRICTION OSCILLATOR

Francis P. Bundy, Medford, Mass., assignor to the United States of America as represented by the Secretary of the Navy Application March 28, 1945, Serial No. 585,351

2 Claims. (Cl. 340—11)

This invention relates to magnetostriction type oscillators which are used for transmitting and receiving high frequency acoustic wave energy. These oscillators have many applications and are particularly adaptable for use in underwater sound echo range and bearing systems for determining the range and bearing of a remotely located underwater object.

It is the general object of this invention to provide a novel and improved construction for magnetostriction type oscillators by which the electro-mechanical efficiency of the oscillator is materially increased. Specifically this object is obtained by using a layer of resilient material between the core of the magnetostriction device and its associated winding, which material will expand and contract and thus absorb the pressure of the metallic core which would otherwise be exerted on the winding and on any liquid present as the core alternately constricts and expands in accordance with alternations of the magnetic field produced by the winding.

To furnish a background for the description of this invention which follows, it might be well to state that a magnetostriction oscillator is a device which comprises a core of material such as nickel or nickel alloy and which has magnetostriction qualities. A coil winding associated with and usually surrounding the core is energized from a source of alternating current to set up an alternating magnetic field in the core. The core is also magnetically polarized either by impressing a component of direct current on the coil along with the alternating known, when the alternating current is applied to the tional field of which threads through the core. As is well known, when the alternation current is applied to the winding, the alternating magnetic field causes the nickel core to undergo a similar alternating constriction and expansion. A portion of the core is placed in acoustic contact with the transmitting medium and hence the alternating constriction and expansion of the core causes acoustic or compressional wave energy of the same frequency as the core alternations to be propagated through the medium which is usually air or water.

Figure 1:
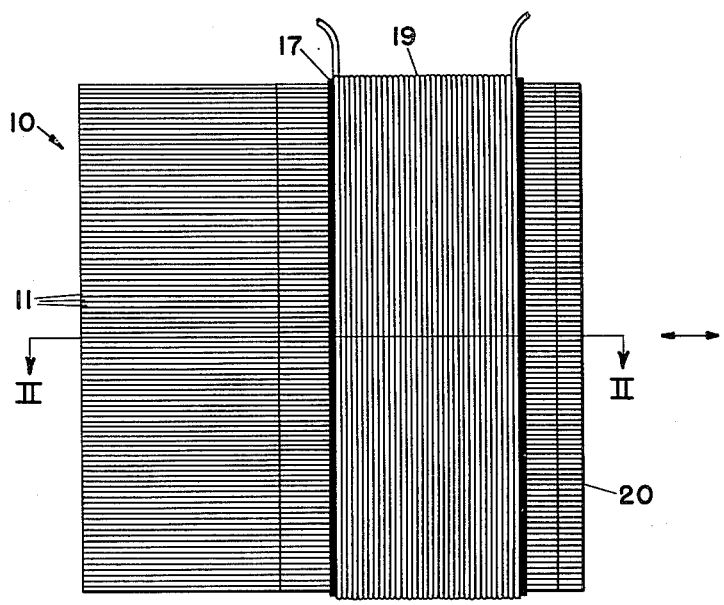
Figure 2:
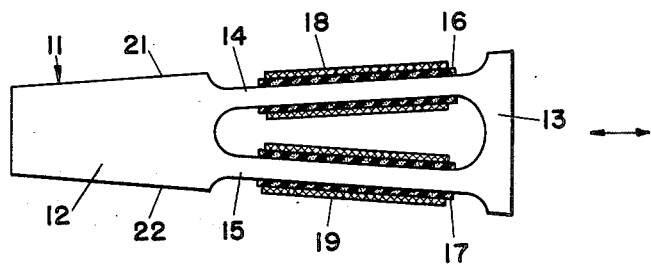

The accompanying drawings show a preferred embodiment of the invention. Fig. 1 is a side elevation of a laminated stack type of magnetostriction oscillator; and Fig. 2 is a longitudinal section taken on lines II—II of Fig. 1.

Referring now to the drawings, the magnetostriction oscillator comprises a stack 10 of laminations 11 of nickel or nickel alloy which are pressed tightly together and then secured by any suitable means as for example by consolidation of a resinous bonding coat. From Fig. 2 it is seen that each lamination 11 is a stamping containing a rear body portion 12, a front body portion 13 and a pair of intermediate leg portions 14, 15. When the laminations 11 are assembled to form the stack, as shown in Fig. 1, each of the plurality of leg portions 14 and 15 thus forms a rectangular core.

Laminations 11 may be from .005" to .010" in thickness and the height of the stack may be from 3" to some 12" or 14", the particular height of the stack being dependent upon the particular wave energy radiation characteristic desired. These dimensions may be determined by known engineering technique and are of no particular importance as regards this invention. After the laminations 11 are assembled into the form shown in Fig. 1, a layer of readily compressible and expansible material 16 such as highly porous rubber often called cellular rubber is placed around core leg 14, and a similar layer 17 is placed around core leg 15. Preferably these two layers extend along both side walls of each core and also cover the top and bottom core walls. If the transducer is to be immersed in liquid, or liquid filled, the cellular rubber should be of the kind in which the bubbles are discrete so that the absorption is low. Liquid absorption in the rubber reduces the efficiency of the layer.

A coil 18 is then wound on core leg 14 over the resilient layer 16 and coil 19 is wound on core leg 15 over the resilient layer 17.

As previously explained, when alternating current is impressed upon coil windings 18 and 19, and cores 14 and 15 are polarized either by superimposing a component of direct current on the windings or by using a permanent magnet, alternations in the alternating current cause the core body to alternately constrict and expand. In the particular construction illustrated, the face portion 20 of the stack of laminations 11 constitutes the radiating face which is to be placed in acoustic contact with the transmitting medium such as air or water. If used under water the stack may be placed directly in the water in which case water will enter the opening in the stack intermediate the core legs 14, 15. The alternating constriction and expansion of the core body will be in the direction of the arrows.

It will be noted that the sides 21 and 22 of laminations 11 are tapered. Thus, any number of complete magnetostriction oscillators of the type shown in Fig. 1 may be assembled side by side to form a partial or complete ring, the particular arrangement depending upon the nature of the acoustic wave energy pattern desired. A complete ring arrangement is shown in the application of Oscar H. Schuck et al., Serial No. 549,460, filed August 14, 1944.

Any coil wound upon, and bearing directly against, a magnetostriction core as is the present practice exerts a substantial mechanical damping influence on the core which materially reduces the freedom of movement that it must have if it is to be efficiently operated. However, by inserting a highly porous rubber layer between each one of the core legs and the winding associated therewith, such layers absorb the pressure of the core which would otherwise be exerted on the windings and liquid filling as the core undergoes its expansion phase of the constriction-expansion cycle.

It has also been found that the porous rubber layers 16 and 17 not only eliminate the mechanical damping losses, but equally or more importantly eliminate what is termed a "pumping loss" in those instances where the oscillator is operated openly immersed in water or enclosed in an oil filled boot. Here the slight expansion and constriction of the nickel core causes the liquid to be alternately drawn in and injected from the opening formed in the core body between core legs 14 and 15, and of course work so done in pumping is clearly lost so far as acoustical efficiency is concerned. With my novel construction of oscillator, the porous layers 16 and 17 absorb substantially all of the expansion of the core legs 14 and 15 with the result that windings 18 and 19 undergo substantially no motion whatsoever. This serves to practically eliminate the pumping action which otherwise is present when the porous layers are not used intermediate the core legs and coil windings associated therewith.

Electro-mechanical efficiency tests on the type of magnetostriction oscillator shown in the drawings, have been conducted, both with the coils 18 and 19 wound directly upon core legs 14, 15, and then with the particular construction shown wherein the porous rubber layers 16, 17 are interposed between cores 14, 15 and the windings 18, 19 associated with these cores. Electro-mechanical efficiency may be defined as the ratio of the mechanical output or acoustic power to the input in electrical power. The results of the tests show that the efficiency of the oscillator was about 15% prior to the addition of the porous layers 16 and 17 but rose to approximately 38% after these layers had been inserted, an increase in efficiency of the order of 150%.

Other types of magnetostriction oscillators tested indicate that at least a 50% increase in efficiency may be expected in almost every instance.

In conclusion, I desire it to be understood that while in accordance with the patent statutes I have shown and described a particular embodiment of the invention, it is to be understood that the principles of construction disclosed herein may be applied equally well to other types of magnetostriction oscillators and that the claims appended hereto are to be so construed.

Having fully described my invention, I claim:

1. A magnetostriction oscillator comprising a stack of laminations composed of magnetostrictive material tightly pressed and securely fastened together and forming a body of magnetostrictive material, each lamination thereof having a tapered front body portion forming a straight radiating face which is adapted to be placed in acoustic contact with a transmitting medium, a pair of intermediate leg portions extending away from said front body portion and converging towards each other, and a tapered rear body portion, said front body portion, intermediate leg portions and said rear body portions being integral and forming a closed magnetic path, said tapered rear body portion converging in a similar manner as said leg portions whereby a plurality of laminated bodies stacked adjacent to each other are adapted to form a circular arrangement, said front body portion having a length approximately a quarter of the size of said rear body portion, energizable windings surrounding each of said leg portions, electrical means for energizing said windings, and a layer of cellular rubber disposed between each of said energizable windings and said leg portions.

2. A magnetostriction oscillator comprising a stack of laminations composed of magnetostrictive material tightly pressed and securely fastened together and forming a body of magnetostrictive material, each lamination thereof having a tapered front body portion forming a straight radiating face which is adapted to be placed in acoustic contact with a transmitting medium, a pair of intermediate leg portions extending away from said front body portion and converging towards each other, and a tapered rear body portion, said front body portion, intermediate leg portions and rear body portion being integral and forming a closed magnetic path, said tapered rear body portion converging in a similar manner as said leg portions whereby a plurality of laminated bodies stacked adjacent to each other are adapted to form a circular arrangement, said front body portion having a length approximately a quarter of the size of said rear body portion, energizable windings coiled around each of said leg portions, electrical means for energizing said windings, and a layer of cellular rubber in which the bubbles are discrete, disposed between each of said energizable windings and said leg portions.

References Cited in the file of this patent

UNITED STATES PATENTS

| | | |
|---|---|---|
| 2,005,741 | Hayes | June 25, 1935 |
| 2,059,107 | Hinton | Oct. 27, 1936 |
| 2,076,330 | Wood et al. | Apr. 6, 1937 |
| 2,160,007 | Turner | May 30, 1939 |
| 2,190,666 | Kallmeyer | Feb. 20, 1940 |
| 2,332,541 | Turner | Oct. 26, 1943 |
| 2,434,285 | Peek | Jan. 13, 1948 |
| 2,472,388 | Thuras | June 7, 1949 |

FOREIGN PATENTS

| | | |
|---|---|---|
| 422,259 | Great Britain | Jan. 8, 1935 |